Patented Mar. 17, 1953

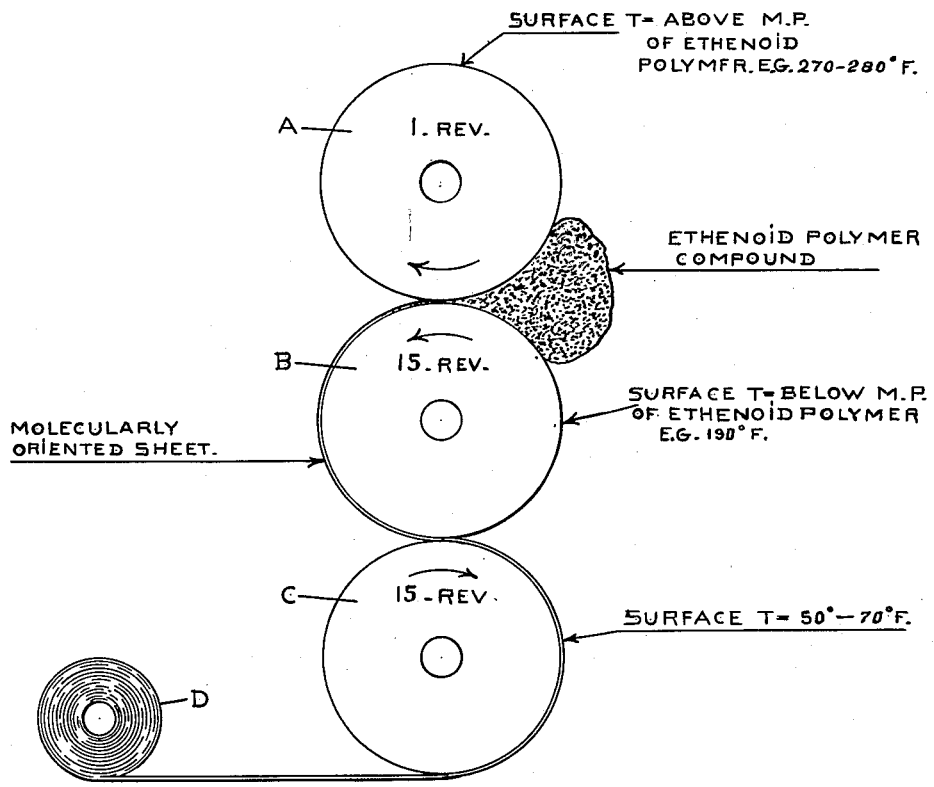

2,631,954

UNITED STATES PATENT OFFICE 2,631,954

POLYETHYLENE FILM AND METHOD OF PREPARING SAME

Willard M. Bright, Chicago, Ill., assignor to The Kendall Company, Boston, Mass., a corporation of Massachusetts Application January 18, 1946, Serial No. 641,903

17 Claims. (Cl. 154—53.5)

This invention relates to the production of self-supporting ethenoid polymer films and is concerned particularly with continuous production, from molecularly unoriented ethenoid polymer masses or elastomer-modified ethenoid polymer masses, of self-supporting films exhibiting molecular orientation in one direction, which films may have, in addition to unique properties of solvent resistance, elasticity, high tensile strength, high tear resistance, exceedingly high dielectric strength, and exceedingly low moisture vapor transmission, special differential surface characteristics which give the films particularly advantageous properties for use in the fabrication of laminates.

Molecularly oriented films of this invention may be transparent, translucent or opaque and may be readily produced commercially in caliper ranging down to 4 mils and even as low as 1 mil.

A main object of this invention is the production of self-supporting molecularly oriented films of ethenoid polymer compounds in such manner as to impart thereto inherent differential surface characteristics giving the films on one surface thereof valuable adhesive receptive properties, useful in the preparation of coated films and laminates.

A further object of the invention is continuous production of self-supporting oriented films directly from bulk masses of unoriented ethenoid polymer compounds. A further object of the invention is the production of self-supporting molecularly oriented films of such compounds without preliminary production of molecularly unoriented films thereof.

In accordance with this invention, self supporting molecularly oriented films are formed from unoriented bulk masses of ethenoid polymers such as those of average molecular weight exceeding 2500 and preferably in the range of about 15,000 to 30,000, obtained by heating ethylene at elevated temperature to a pressure of at least 500 atmospheres, in the presence of one or more organic compounds containing one or more double bonds and capable of forming dimers or higher polymers; the ethenoid polymers having a composition corresponding substantially to the empirical formula

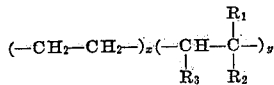

where $R_1$ is hydrogen or an alkyl group, $R_2$ and $R_3$ are monovalent radicals such as hydrogen, alkyl, phenyl or substituted phenyl, or vinyl or substituted vinyl, and the ratio $x:y$ exceeds 1:5, and is preferably greater than 1:1, and exhibiting a crystalline structure by X-ray diffraction analysis and having a melting or softening point greater than 212° F. and preferably in the range of 212° F. to 350° F. (A. S. T. M. D 569–43). Solid ethenoid polymers and interpolymers of this type are described in United States Patent No. 2,153,553 and Bristish Patent No. 497,643, the homopolymer being polyethylene. Such bulk masses may be modified in the direction of greater flexibility and elasticity by compounding therewith to form homogeneous molecularly unoriented bulk blends, hydrocarbon elastomers such as crude rubber, reclaim rubber, balata, polyisobutylene, polybutadiene, and butadiene and isoprene or styrene copolymers, preferably in the form of solids having molecular weights exceeding 40,000, although lower molecular weight elasto-viscous forms of these or other hydrocarbon polymers may be substituted in whole or in part, such as those having molecular weights ranging from 1,000 to 40,000.

Bulk compounding of such elastomers or elasto-viscous materials with ethenoid polymers as above described may be accomplished by blending the materials as on a rubber mill at a temperature exceeding the melting point of the ethenoid polymer component, although solvent mixing is contemplated as another satisfactory method for obtaining similar molecularly unoriented elastomer-modified ethenoid polymer masses for utilization in accordance with this invention. For example, in the case of rubber mill blending, the elastomer component may be fed onto the rubber mill and the ethenoid polymer component then added in the form of chips, the mill temperature being maintained above the melting point of the ethenoid polymer component and preferably substantially thereabove. For example, in the case of polyethylene having a melting point of about 220° F. and an average molecular weight in terms of Williams Flow Height of 55 mils at 130° C. as described on page 4 of a publication of Bakelite Corporation entitled, "Polyethylene Resins," copyright 1944, a suitable mill temperature is from 270 to 280° F.

For the purposes of preparation of films of this invention from such bulk blends, the proportion of the components of the blend may be varied to form elastomer-modified ethenoid polymer compounds wherein the elastomer component comprises from 0 to 66% based upon the polymer content. Where the elastomer ingredient exceeds 66%, films of the invention formed there-from tend to have residual surface tackiness. Accordingly, I have found that amounts of the elastomer in the order of 10–12%, based on the weight of the polymer, are most useful.

Polyethylene sheets produced by others and known to me, whether modified by the inclusion of elastomers as above described or not, have been cast from solutions thereof in volatile solvents, or extruded through orifices formed by stationary surfaces or well-known rubber extrusion apparatus, or built up on the hot roll of a rubber mill. These techniques produce molecularly unoriented sheets having substantial elongation both longitudinally and laterally, the elongation in a cast or extruded film of 4-mil thickness being as much as 800% and almost always exceeding 500%. Such degree of extensibility prevents the use of such molecularly unoriented films for many purposes where tensile strength and lack of excessive extensibility are essential.

In accordance with this invention, ethenoid polymers in their bulk, molecularly unoriented form, or blended with elastomers as above described, as received from the rubber mill after blending, may be formed directly into molecularly oriented films of good tensile strength and of limited extensibility in the direction of molecular orientation, thus providing highly useful films capable of being handled in coating and laminating operations on apparatus and in manners not possible with films possessing the higher extensibility values of molecularly unoriented sheets formed from the same materials by casting, extrusion or other previously known techniques.

In the drawing, I have diagrammatically illustrated apparatus suitable for use in the production of self-supporting molecularly oriented films of this invention.

As there shown, a mass of ethenoid polymer, prepared as hereinbefore described, and comprising for example 90% polyethylene (of molecular weight in excess of 10,000) and 10% polyisobutylene (Vistanex B–100 of molecular weight averaging 50,000) is deposited at the nip of two calender rolls adjusted to provide a nip spacing conforming to any particular film thickness desired, for instance from 10 mils down to 1 mil. The top roll A is heated, preferably internally, to a temperature above the melting point of the particular polymer being utilized; in the case of polyethylene, for example, to 270° F. The middle roll B is heated, preferably internally, to an elevated temperature below the melting point of the particular polyethylene being utilized, for instance to 190° F. The roll A, during operation, is rotated at a substantially less speed, as hereinafter more fully explained, than calender roll B with the result that, under the given temperature conditions, the mass deposited at the nip will be extruded between the nip of rolls A and B to form a layer of substantially uniform thickness conforming to the spacing of the nip, adherent to the surface of calender roll B. The layer of material is then carried from the surface of roll B into contact with a lower calender roll C rotating at the same speed as calender roll B but chilled relative thereto and having a surface temperature say of 50 to 70° F. The sheeted layer is stripped from calender roll B and passed around calender roll C to a takeup roll D.

Satisfactory films may be formed upon such apparatus without rotating calender roll A, but, in order to prevent undue wear at the nip surface, the calender roll A is preferably rotated at a very slow speed just sufficient to equalize wear over its entire surface area. The speed of calender roll B is then adjusted for satisfactory operation with a surface speed greater than that of calender roll A. My experience has shown that when the speed ratio of roll B to roll A is maintained in the range of from 5:1 to 30:1 and preferably at 15:1, the action at the nip is such that the ethenoid polymer mass is subjected to a drawing action prior to passage into or during passage through the nip under the frictional influence of the surfaces of calender rolls A and B operating at the differential surface speeds; and this drawing action results in a molecular orientation in the direction of advance prior to emergence of the material from the nip in its sheet form adherent to middle calender roll B, so that the sheet as formed on roll B exhibits longitudinal molecular orientation.

The sheet emerging from the nip between rolls A and B has different surface characteristics. Its inner surface adherent to roll B is smooth. On the contrary, the upper or outer surface of the sheet has a visibly different appearance from the surface formed against middle calender roll B, the upper surface having a matte appearance and being rougher. The difference is particularly apparent under the microscope, the upper surface having substantially increased surface area as compared with the surface area of the opposite or inner side of the adherent film.

These characteristics are the result of the action at the nip. Apparently the portion of the mass which contacts middle roll B in advance of the nip is cooled by roll B to form a skin which is carried through the nip at the speed of advance of roll B. Roll A surface however, advancing at a less speed, causes a drag on the material so that the upper surface of the sheet comes off roll A at a speed greater than the speed of roll A, with resulting roughness and the sheet has a difference in the degree of molecular orientation through the thickness of the sheet with an internal molecular orientation greater than the molecular orientation at the smooth surface.

These differential surface characteristics are preserved in the film after cooling and are an inherent characteristic of the film as taken up on the takeup roller D. To the naked eye, the differential surface characteristics are emphasized in cases of films formed from materials containing small proportions of pigments.

Films of 5-mil thickness formed as above described are elastic and have an elongation of about 150% in the direction of molecular orientation and of about 400 to 600% in the direction transverse to that of molecular orientation, and the films can be produced in caliper ranging from 1 mil up to 20 mils or more.

With regard to caliper, while unoriented films produced by casting or extrusion methods may be cold drawn, a cold drawing operation decreases caliper to such an extent that continuous cold drawn oriented ethylene polymer films of caliper greater than 1 mil are unknown to me, the casting process for forming ethylene polymer films being incapable of commercially producing uniform unoriented films of sufficient thickness to permit the attainment of caliper as great as 4 mils after cold drawing.

With regard to pigments, I have found that rubber-type compounding pigments such as zinc oxide, titanium dioxide, or carbon black, may be utilized. Also rubber-type compounding colors are compatible with the unoriented ethenoid polymer masses and may be intermixed therewith prior to formation of the film, preferably on the rubber mill, without affecting to any material extent the elasticity, tensile strength, dielectric strength, solvent resistance or moisture vapor resistance of the sheet. Furthermore, such pigments and colors, because they are uniformly interspersed through the thickness of the sheet may provide opacity even when included in such small amounts as 1 to 5% by weight of the combined elastomer-ethenoid polymer components. For example, I have successfully utilized such as red of the lithosol type, orange of the azo type, and green of the copper phthalocyanine type and combinations thereof in a proportion of 250 grams of color to 11 pounds of blend consisting of 1 pound of Vistanex B-100 and 10 pounds of polyethylene.

As other examples, polyethylene of the above or other types or other of the ethenoid polymers above or hereafter described may be modified with 5, 10, 15, 20 or 30% of polyisobutylene based upon the combined weight of the ethenoid polymer and the modifier; 10, 20 or 30% of rubber (smoked sheet) or 10, 20 or 30% of butyl rubber (GR-I—isobutylene-isoprene copolymer). In general, ultimate tensile strength decreases along a sharp curve dropping to two-thirds the value of the unmodified film at 10% modifier content and to one-third at 50% modifier content. However, use of the modifiers imparts better wetting characteristics to the sheet and better flexibility.

As illustrative of useful solid ethenoid polymers other than polyethylene, mention may be made of copolymers of ethylene and styrene where the ratio $x:y$ is 1:3, 1:1 or 3:2; of ethylene and pentene-2 where the ratio $x:y$ is 4:1; and of ethylene and stilbene where the ratio $x:y$ is 5:1.

As previously stated, the surface characteristics of films of this invention are such that the matte or rougher side thereof possesses highly favorable adhesive receptive and retentive characteristics for coatings, and for binders in the fabrication of laminates. For example, the film may bear on its matte surface side a layer of potentially adhesive or adhesive material of the solvent-sensitive, heat-sensitive or pressure-sensitive type, either with or without additional laminae of woven or unwoven fibrous or non-fibrous membranaceous sheets, such as of cloth, unwoven textile fiber, paper, cellophane, cellulose acetate, ethyl cellulose, or polyvinyl ester or copolymer sheets. Solvent-sensitive and heat-sensitive materials are hereinafter indicated.

However, due to the relatively low softening points of films of this invention and their tendency to swell upon contact with hydrocarbon solvents, certain precautions are necessary during coating or laminating operations. For example, molecularly oriented polyethylene films of this invention when subjected to temperatures as high as 190° F. under tension of the type found in continuous oven drying operations will result in shrinkage of the film often sufficient to cause breakage. At 230° F. polyethylene films of this invention will shrink in the direction of their oriented length to one-fifth of their oriented lengths. It is therefore is not advisable to utilize oven temperatures exceeding 190° F. for driving off solvents utilized in solvent-spreading coatings on polyethylene films of this invention.

Again, films of this invention, although insoluble in conventional volatile hydrocarbon solvents, are slightly swollen thereby, and in sheets of commercial spreading widths, such as 40 inches, application of coating materials to the films in conventional volatile hydrocarbons such as benzene, xylene or toluene or a gasoline type solvent, by conventional methods will tend to cause such warping and curling of the sheet as to make commercial continuous spreading operations unfeasible, if not impossible.

However, adhesive coatings may be spread in volatile hydrocarbon solvents, without warping, curling or otherwise distorting the sheet as by applying only very thin coatings in succession and flash drying after each coat, or by drying the coating while the sheet is stretched over a drum, or by simultaneously applying to the opposite surface of the film a thin coating of a hydrocarbon solvent of properly chosen higher boiling point than that of the coating solvent so as to counteract the warping and curling which otherwise would occur, by equalizing the swelling on both sides of the film until the solvent is driven off. When these methods of application are carried out with proper attention to the temperature of the sheet at the time of application to cause a mutual solution of the backing and the adhesive in the solvent, particularly high adhesion is attained between coating and backing all as described and claimed in my application Serial No. 641,902 filed simultaneously herewith and now abandoned. The presence of the roughened surface of the backing of this application presents additional surface area to the solvent and therefore tends to cause a greater mutual solution than in the case of an ordinary ethenoid polymer sheet surface.

On the other hand, backings of this invention may be satisfactorily coated with adhesive materials which are soluble in oxygenated organic solvents such as acetone or other ketones or in alcohols. Since oxygenated solvents do not swell and warp the films of this invention and additionally have lower boiling points, the coatings may be dried at temperatures well below a temperature which would shrink the film and as low as 140° F. Coatings of this type are set forth and claimed in my copending application Serial No. 642,131, now abandoned.

In addition, adhesive materials which are hydrocarbon soluble or soluble in oxygenated organic solvents may be calendered, without the necessary use of solvents, onto films of this invention which, because of their molecular orientation resulting in limited extensibility, have sufficient tensile and retractive strength to permit successful calendering operations, including stripping of combined pressure-united layers of film and pressure-sensitive adhesive from the center roll of three-roll calender apparatus.

Among heat-sensitive materials which may be spread on the matte surface as by calendering, hot-melt or solvent-spreading technique for the purpose of providing binder layers for additional lamina as of some other sheet material, mention may be made either of thermoplastic binders having melting points below the softening point of the film such as waxes, polyethyl methacrylate, plasticized polyvinyl chloride acetate, polyvinyl ethers or of the thermosetting type having a curing temperature below the softening point of the film.

In the case of pressure-sensitive adhesives, films of this invention provide excellent backing materials because of the preferential adhesion between the coated adhesive and the matte surface of increased area as compared with adhesion of the pressure-sensitive adhesive to the opposite smoother glossy surface of less area of the film, when the adhesive tape is in roll form, permitting direct application of the adhesive to the matte surface, and obviating the necessity of any back surface repellent for the adhesive. Similarly in the case of laminate binders, the matte surface lends physical qualities enhancing adhesion and lessening tendency to delaminate.

I claim:

1. The method of producing a molecularly oriented film of a solid ethenoid polymer selected from the group consisting of ethenoid polymers exhibiting a crystalline structure by X-ray diffraction analysis and having the empirical formula:

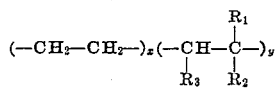

where $R_1$ is hydrogen or an alkyl group; and $R_2$ and $R_3$ are monovalent radicals falling within the group hydrogen, alkyl, phenyl, substituted phenyl, vinyl, substituted vinyl; and the ratio $x:y$ exceeds 1:5; comprising depositing a molecularly unoriented bulk of said ethenoid polymer maintained at a temperature above the crystallization point temperature of said polymer between converging surfaces having different surface temperatures and a differential rate of surface movement with the surface having the greater rate having a surface temperature below the crystallization point temperature of said polymer to crystallize said polymer, and the other of said surfaces having a warmer surface temperature above said crystallization point temperature, and drawing said ethenoid polymer from said bulk by movement of said cooler surface away from said bulk and relative to said warmer surface in the form of a continuous layer of said ethenoid polymer adhering to said cooler surface, the shear to which said layer is subjected as it moves across said warmer surface and caused by the differential movement of said cooler surface relative to said warmer surface orienting molecules of the polymer in the direction of movement of said layer, thereby creating directly on said cooler surface a continuous molecularly oriented crystalline film of said ethenoid polymer having substantially less elongation longitudinally than transversely.

2. The method as claimed in claim 1, having as an additional step, continuously stripping the adherent molecularly oriented crystalline film from said cooler surface in continuous lengths exceeding the length of said cooler surface.

3. The method of producing a molecularly oriented film of a solid ethenoid polymer selected from the group consisting of ethenoid polymers exhibiting a crystalline structure by X-ray diffraction analysis and having the empirical formula:

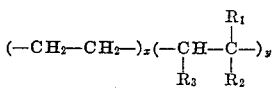

wherein $R_1$ is hydrogen or an alkyl group; and $R_2$ and $R_3$ are monovalent radicals falling within the group hydrogen, alkyl, phenyl, substituted phenyl, vinyl, substituted vinyl; and the ratio $x:y$ exceeds 1:5; comprising depositing a molecularly unoriented bulk of said ethenoid polymer, maintained at a temperature above the crystallization point temperature of said polymer, at the nip formed by two rolls having a differential rate of rotation with the roll having the greater rotation rate having a surface temperature below the crystallization point temperature of said polymer, to crystallize said polymer, and the other roll having a warmer surface temperature above said crystallization point, and drawing said ethenoid polymer with the rotation of said cooler roll from said bulk through said nip in the form of a continuous layer of said ethenoid polymer adhering to the cooler roll, the shear at the nip, caused by said differential rate of rotation, orienting molecules of the polymer in the direction of movement of said layer, thus creating directly on said cooler roll a continuous molecularly oriented crystalline film of said ethenoid polymer having substantially less elongation longitudinally than transversely, and continuously stripping the adherent molecularly oriented crystalline film from said roll in continuous lengths exceeding the circumference of the roll from which the film is stripped.

4. As a new article of manufacture, a film produced in accordance with the method claimed in claim 1.

5. A pressure-sensitive adhesive sheet comprising a film produced in accordance with the method claimed in claim 1, and a coating of a pressure-sensitive adhesive material affixed to one surface of said film.

6. A pressure-sensitive adhesive sheet comprising a film produced in accordance with the method claimed in claim 1, and a coating of a pressure-sensitive adhesive material affixed to the surface of the film opposite the surface adhering to the cooler moving surface during the production of the film.

7. The method as claimed in claim 1, wherein the solid ethenoid polymer has compounded therewith, based upon the weight of the ethenoid polymer, up to 66% by weight of a hydrocarbon elastomer having a molecular weight in excess of 40,000.

8. As a new article of manufacture, a film produced in accordance with the method claimed in claim 7.

9. As a new article of manufacture, a film produced in accordance with the method claimed in claim 7, wherein the ethenoid polymer is polyethylene and the hydrocarbon elastomer is polyisobutylene.

10. As a new article of manufacture, a film produced in accordance with the method claimed in claim 7, wherein the ethenoid polymer is polyethylene and the hydrocarbon elastomer is natural rubber.

11. As a new article of manufacture, a film produced in accordance with the method claimed in claim 7, wherein the ethenoid polymer is polyethylene and the hydrocarbon elastomer is a butadiene copolymer.

12. As a new article of manufacture, a film produced in accordance with the method claimed in claim 7, wherein the ethenoid polymer is polyethylene and the hydrocarbon elastomer is an isobutylene-isoprene copolymer.

13. As a new article of manufacture, a film produced in accordance with the method claimed in claim 7, wherein the ethenoid polymer is polyethylene and the hydrocarbon elastomer is a butadiene-styrene copolymer.

14. A pressure-sensitive adhesive sheet comprising a film produced in accordance with the method claimed in claim 7, and a coating of a pressure-sensitive adhesive material affixed to one surface of said film.

15. A pressure-sensitive adhesive sheet comprising a film produced in accordance with the method claimed in claim 7, and a coating of a pressure-sensitive adhesive material affixed to the surface of the film opposite the surface adhering to the cooler moving surface during production of the film.

16. The method as claimed in claim 3, wherein the solid ethenoid polymer is polyethylene compounded with, based upon the weight of the polyethylene, about 10% of polyisobutylene of molecular weight in excess of 40,000.

17. A pressure-sensitive adhesive sheet comprising a film produced in accordance with the method claimed in claim 16, and a coating of a pressure-sensitive adhesive material affixed to one surface of said film.

WILLARD M. BRIGHT.

REFERENCES CITED

The following references are of record in the file of this patent:

UNITED STATES PATENTS

| Number | Name | Date |
|---|---|---|
| 1,883,421 | Stevens | Oct. 18, 1932 |
| 2,054,115 | Abrams et al. | Sept. 15, 1936 |
| 2,067,025 | Schmidt | Jan. 5, 1937 |
| 2,212,770 | Foster | Aug. 27, 1940 |
| 2,219,700 | Perrin et al. | Oct. 29, 1940 |
| 2,278,515 | Gibb | Apr. 7, 1942 |
| 2,327,627 | Esselen | Aug. 24, 1943 |
| 2,331,610 | Kemp | Oct. 12, 1943 |
| 2,332,265 | Schmidt | Oct. 19, 1943 |
| 2,334,585 | Schiemann | Nov. 16, 1943 |
| 2,364,001 | Schiemann | Nov. 16, 1943 |

FOREIGN PATENTS

| Number | Country | Date |
|---|---|---|
| 514,687 | Great Britain | May 3, 1939 |
| 113,771 | Australia | Sept. 11, 1941 |

OTHER REFERENCES

Devisser, "The Calender Effect and the Shrinking Effect of Unvulcanized Rubber," Crosby Lockwood & Son, London, 1926—pp. 143–150.